US006802481B2

(12) United States Patent
Newburn et al.

(10) Patent No.: US 6,802,481 B2
(45) Date of Patent: Oct. 12, 2004

(54) SPINNING MULTIPLE CONTAINER CONTAINMENT RACK

(75) Inventors: Kenneth Tyrone Newburn, Lucedale, MS (US); Daniel Norman Hart, Vancleave, MS (US)

(73) Assignee: Kenneth T Newburn, Lucedale, MS (US)

( * ) Notice: Subject to any disclaimer, the term of this patent is extended or adjusted under 35 U.S.C. 154(b) by 0 days.

(21) Appl. No.: 10/150,820

(22) Filed: May 14, 2002

(65) Prior Publication Data

US 2003/0213879 A1 Nov. 20, 2003

(51) Int. Cl.[7] .......................... A47J 47/16; A47G 29/00
(52) U.S. Cl. .......................................... 248/145; 211/78
(58) Field of Search ................................. 248/131, 145, 248/149, 121, 125.7, 202.1, 144; 211/78, 77, 80, 71.07, 85.23, 196

(56) References Cited

U.S. PATENT DOCUMENTS 129,507 A * 7/1872 Woodworth ................. 211/77
342,476 A * 5/1886 Swartwout ................... 211/75
2,534,680 A * 12/1950 Poirier et al. ................. 211/76
2,662,644 A * 12/1953 Alexander ................... 211/77
2,794,554 A * 6/1957 Hay ........................ 211/85.23
3,130,837 A * 4/1964 Baker .......................... 211/83
3,194,403 A * 7/1965 Van Horn, Jr. ................ 211/78
3,283,913 A * 11/1966 Van Horn, Jr. ................ 211/78
3,642,145 A * 2/1972 Shelton ....................... 211/78
4,971,234 A * 11/1990 Hay ........................ 224/42.32
5,580,015 A * 12/1996 Baker ......................... 248/145

* cited by examiner

*Primary Examiner*—Leslie A. Braun
*Assistant Examiner*—Tan Le
(74) *Attorney, Agent, or Firm*—Mark O Loften

(57) ABSTRACT

The inventors present an improved rotatable multi-receptacle support device. These type devices are commonly used to house up to four circular receptacles that can be rotated about a center post affixed to the ground for the convenience of the user. The improvements made to this device by the inventors comprise improved receptacle containment by forming the receptacle housing into a basket-shaped cavity with a top ring and a plurality of adjustable chain segments hanging below. This basket shaped cavity of adjustable depth can accommodate a broader range of receptacle shapes and sizes and provides better lateral support in instances where rapid removal and replacement of receptacles is required as in home refuse collection. An additional improvement is provided by means of a second structural support overlay, in addition to the primary support armatures, which connects the outer rim of each top ring to the center post. This overlay greatly improves the dispersion of structural support across the device, which is especially useful when receptacles of variable weight are placed on each of the receptacle support means. A third improvement is added which allows the user to insert a removable pin through a series of apertures bored into the rotation means on top of the center post and prevent rotation of the receptacle support system when the user so desires.

1 Claim, 5 Drawing Sheets

Assembled working Rack

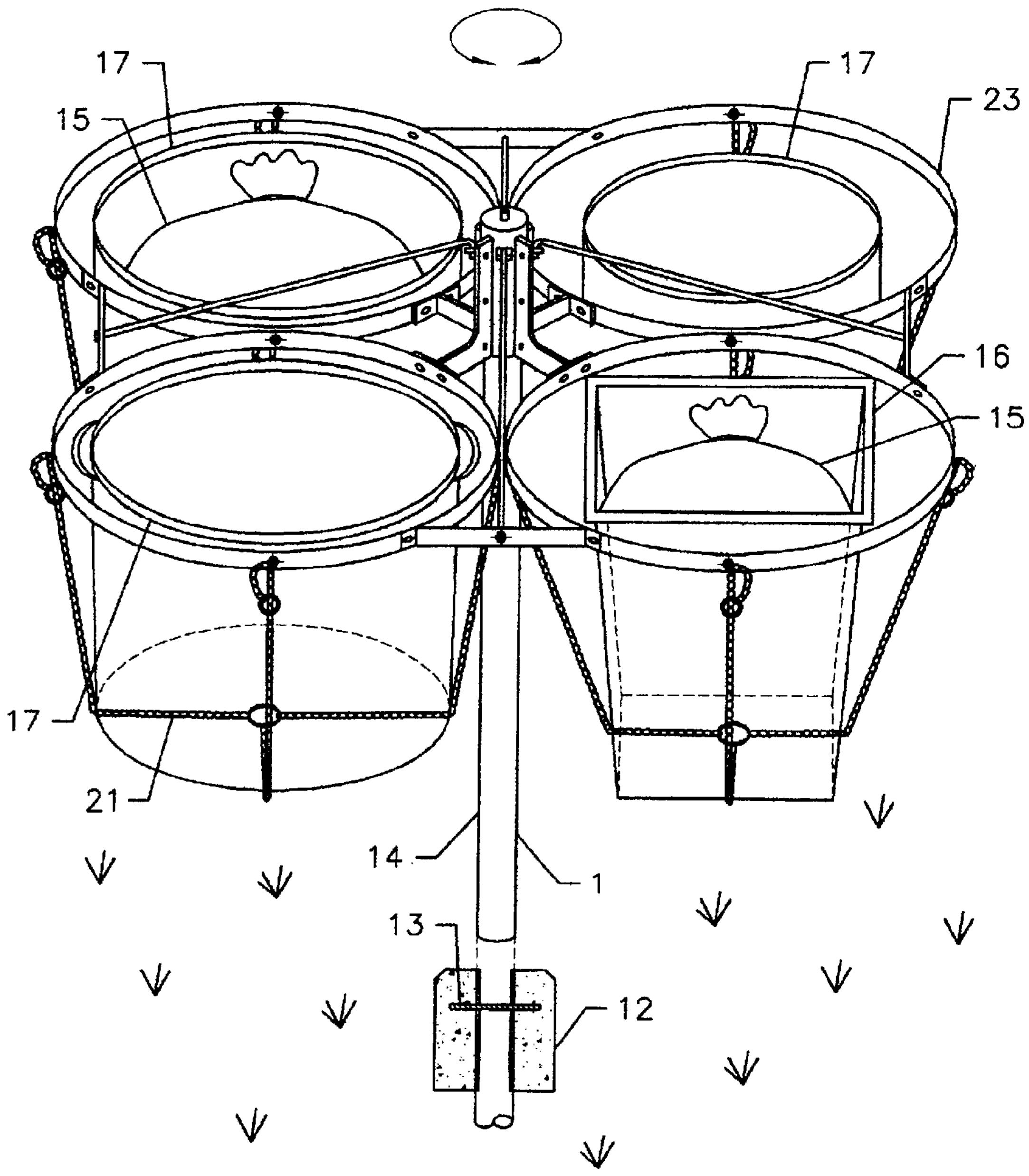
FIG. 1 – Assembled working Rack

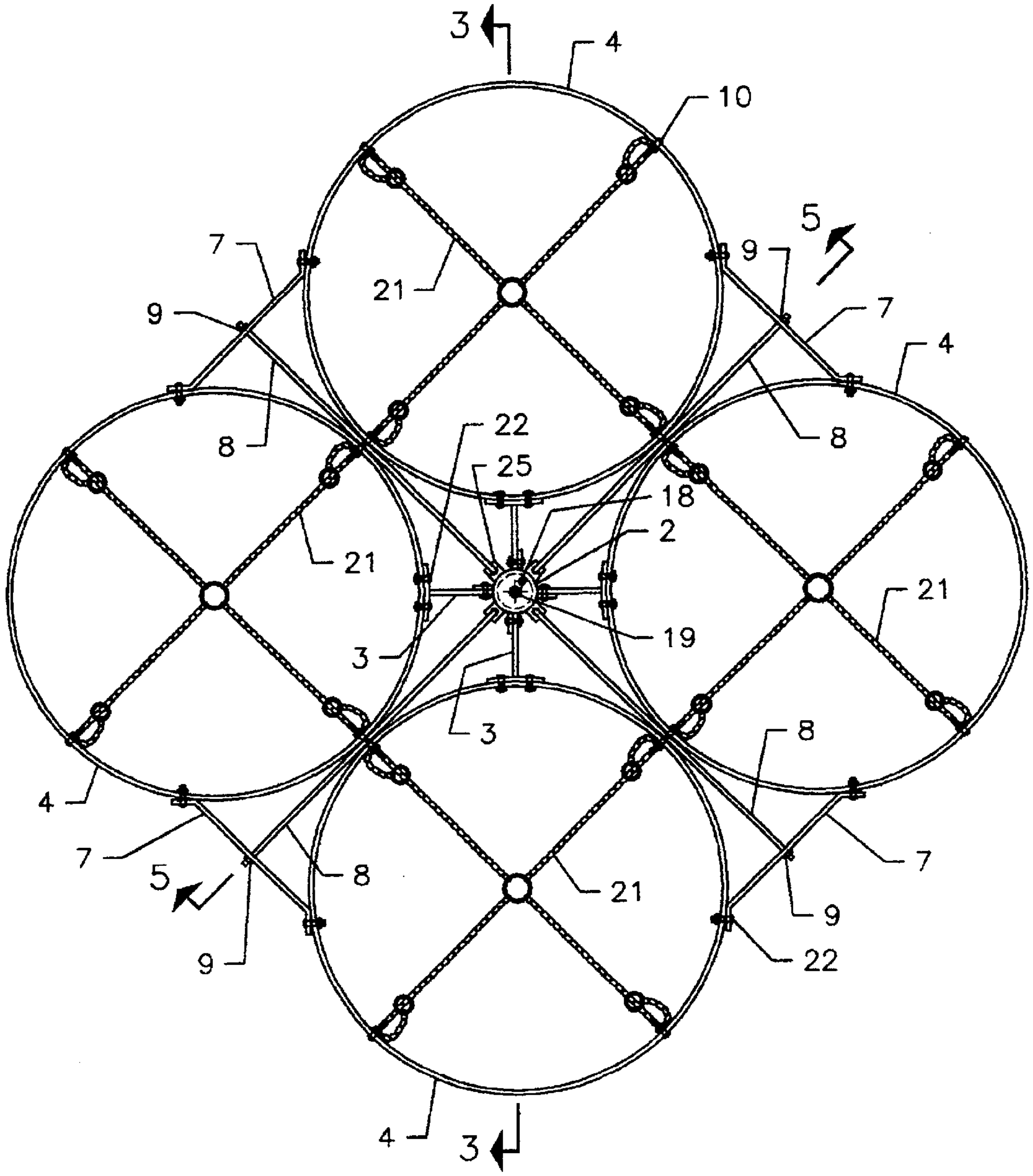
FIG. 2 – Rack Plan View

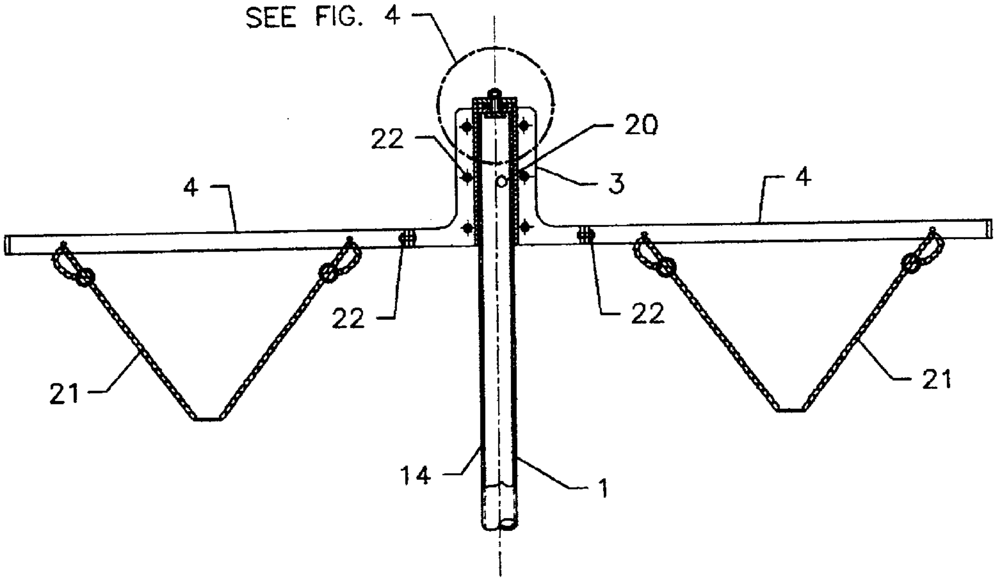
FIG. 3 – Rack Sectional View
Container Support System
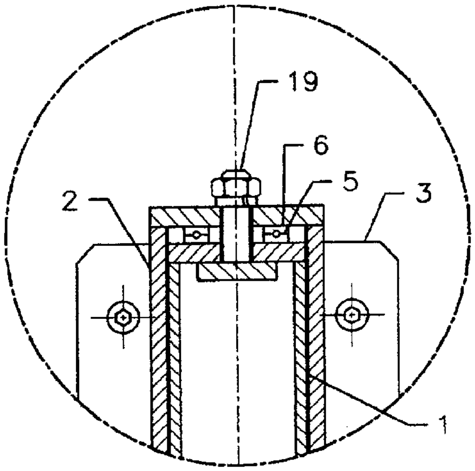
FIG. 4 – Enlarged View

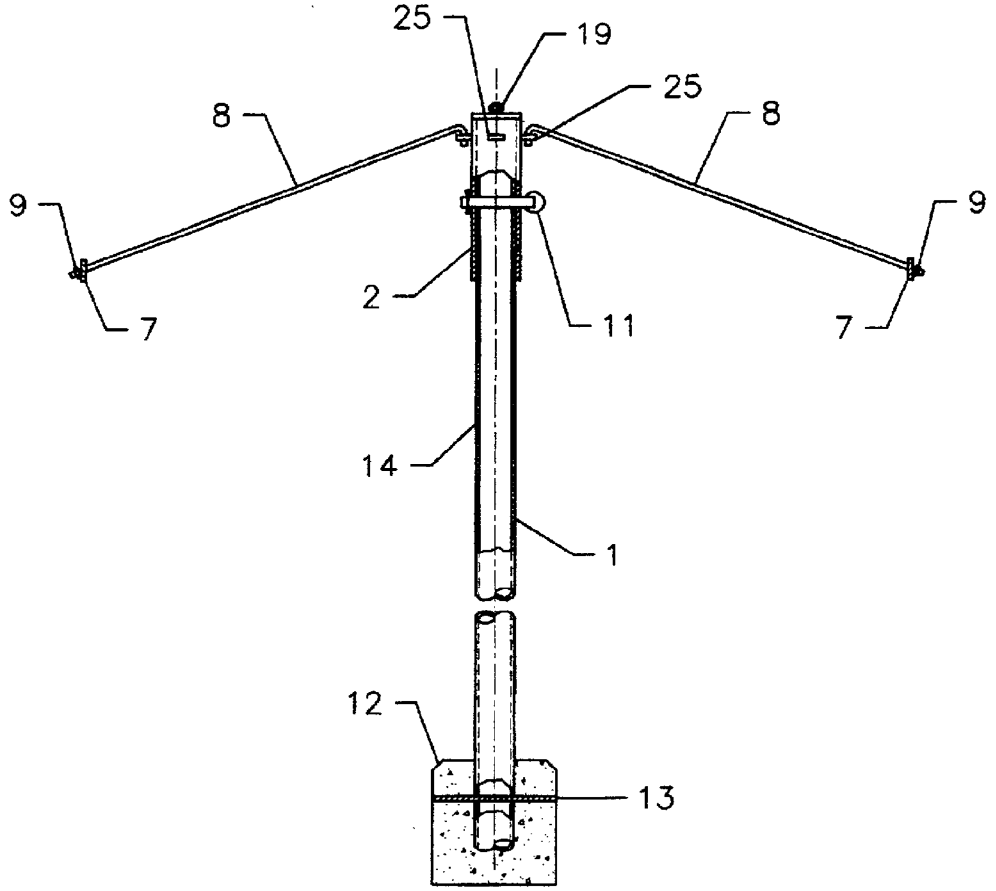
FIG. 5 – Rack Sectional View
Rack Support System

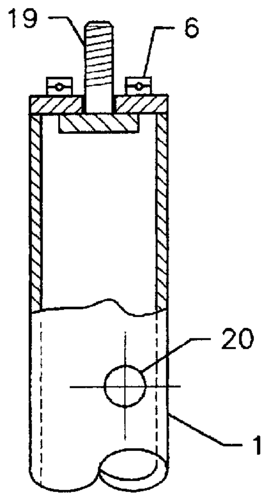
FIG. 6 – Support Post
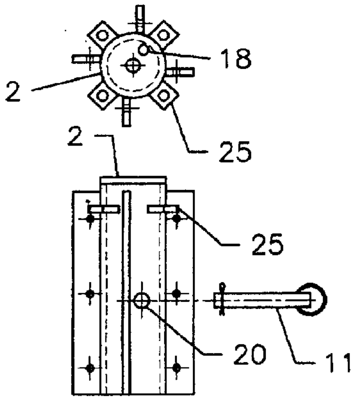
FIG. 7 – Hub & Rack Stop Pin
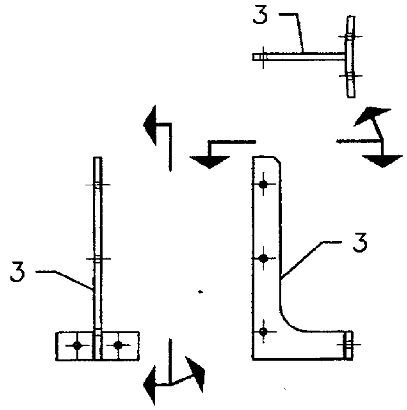
FIG. 8 – Support Bracket
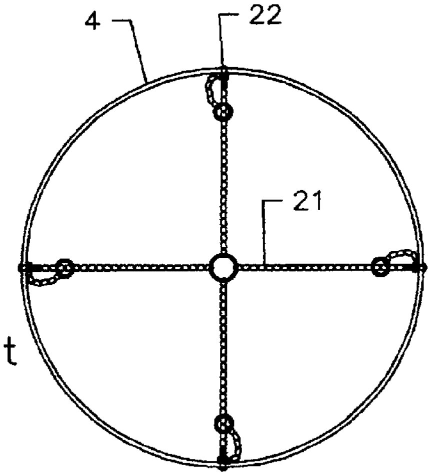
FIG. 9 – Waste Container Support & Containment System
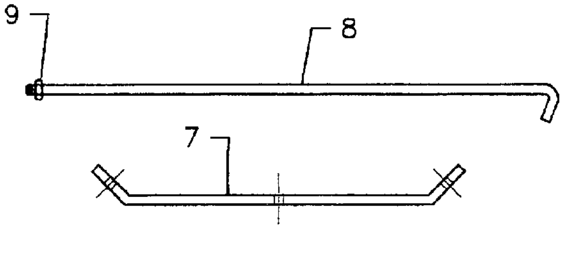
FIG. 10 – Rack Support Pc

SPINNING MULTIPLE CONTAINER CONTAINMENT RACK

CROSS REFERENCE TO RELATED APPLICATIONS

N/A

STATEMENT REGARDING FEDERALLY SPONSORED RESEARCH AND DEVELOPMENT

N/A

REFERENCE TO SEQUENCE LISTING, A TABLE OR COMPUTER PROGRAM LISTING COMPACT DISK

BACKGROUND OF THE INVENTION

1. Field of the Invention

This invention generally relates to the field of multi-receptacle support devices. More specifically, this invention provides a device with improved structure and functionality for retaining a multitude of refuse cans or other receptacle containers. This invention also offers further improvement over other rotatable multi-receptacle support devices in that the receptacle support structure can be locked in place to prevent rotation when not desired by the user. These type of multi-receptacle support devices are most often employed by users desiring 1) to segregate refuse or other materials, 2) to facilitate storage and collection of refuse or other materials, 3) to prevent animal nuisances with refuse, and 4) to increase storage capacity of refuse or other materials.

2. Description of Related Art

Various forms of refuse container support systems are known in the art. However, only one device is presently known in the art that is directed to a rotatable, multi-container system. In U.S. Pat. No. 5,580,015 issued Dec. 3, 1996 to Baker, Baker discloses a rotating, mult-receptacle support stand comprising an upright central support post, anchored on one end to the ground as part of a concrete footing, and a series of refuse receptacle support trays quadratically placed around the central support post. Each refuse receptacle support tray is connected to a support member that is attached on one end to the support tray and on the other end to a collar attached to the top end of the central support post. Baker also discloses a bearing element located just below the collar attached to the top end of the central support post, which allows the receptacle tray, arms and collar to freely rotate around the central support post.

Although the Baker device discloses a useful multi-receptacle support system, that device has several limitations which are overcome by the improved device disclosed herein. First, Baker's receptacle support trays are direct to a means for supporting the bottom of the receptacle. In many instances, support only of the bottom of the receptacle may be inadequate for certain users. Each of the bottom support trays disclosed by Baker employs a circular sheet of metal or wire grid containing an annular raised rim, which must be of a diameter larger than the diameter of the user's circular receptacle container. Although Baker does not state the vertical dimension of this annular rim, Baker's drawings indicate that is relatively shallow. Herein lies a major deficiency of the Baker design. First, a shallow annular rim does not provide adequate lateral containment of the receptacles placed on the tray. Baker's design clearly does not anticipate the necessity and extent of lateral containment and therefore presents a device of very limited utility in many applications. Second, Baker's device also does not effectively work in situations where refuse collectors, often in hurry, toss the receptacles back into the support system. Under these circumstances, Baker's device is also not effective in that the receptacles often bounce off of the shallow support tray and scatter on the ground around the device.

A further limitation of the Baker device lies in the design of the rotating collar about the central support post. Baker appears to have designed his rotating collar with the intent that free-rotation is the preferred embodiment. However, as a practical matter, free-rotation is in fact not a preferred embodiment, especially in applications involving refuse collection. In this application, for example, the movement of receptacles on to and off of the support trays by refuse collectors typically imparts an undesired rotational movement of the support system around the support post, which that frustrates the ability of refuse collectors to effectively replace the receptacles back on to the support tray. This often results in the device owner having to himself stop and carefully replace the receptacles back on to the support trays. In addition, owners of the Baker systems often come home to find children at play hanging on the support trays and spinning around the central post. Since Baker does not disclose a means for preventing free rotation, the owners are often required to place objects, unmovable by children, within the area around the support trays to block rotation and deter potentially dangerous playing with the system. Moreover, a latchable systems would be preferred by users employing this system to feed livestock since the animals could feed them selves without have their interaction impart unwanted rotation.

A still further limitation of the Baker device lies in the limited strength and stability of the receptacle support tray system when under heavy or unbalanced receptacle loads. Because Baker's support trays are only connected to the central support post by a single armature, when rotated under heavy or unbalanced receptacle loads, a binding action can occur on the collar and bearing which can inhibit movement and stability of the system. The inventor's present a framework system around the receptacles which greatly improves the stability of the system and allows better distribution of forces around the structure.

SUMMARY OF THE INVENTION

The improved multi-receptacle containment device presented herein overcomes the mechanical and practical inefficiencies in the prior art by providing a more effective receptacle retainer means.

A further improvement of the device presented herein is the ability to prevent free rotation of the receptacle containment systems to make it safer and more effective in applications where rotation of the system under action of the user is not desired.

A further improvement of the device present herein is the ability to accommodate a larger variety of receptacle types, dimensions and designs to provide users with more applications in which a multi-receptacle system could be employed.

A still further objective of the device presented herein is to provide an improved multi-receptacle support device that is easy to construct and assemble, while providing all of the benefits disclosed herein.

A still further objective of the device presented herein is to provide and improved receptacle support structure which provided better distribution of weight forces across the frame structure to accommodate receptacles of different weights or partially empty retainers. Such a system will also last longer in harsh environments, for example, where refuse collectors toss empty receptacles into the device rather than carefully place them there.

BRIEF DESCRIPTION OF THE SEVERAL VIEWS OF THE DRAWINGS

FIG. 1 is a perspective view of the improved multi-receptacle support system disclosed herein with special attention being drawn towards the basket-style design presented as the inventor's preferred embodiment.

FIG. 2 shows a top view of the multi-receptacle support system disclosed herein better showing the individual pieces which connect to outside circumference of the central hub to create said assembly.

FIG. 3 is a side cross-sectional view (taken in the direction of arrows marked 3 in FIG. 2) of multi-receptacle support system, showing certain parts with special attention being drawn towards the flexible container containment elements connected to outside circumference of shown rigid hoops.

FIG. 4 is an enlarged view of the encircled area of FIG. 3 showing the element for rotation placed between central hub and top cap of support post. FIG. 4 also shows the support post to central hub connection bolt and nut.

FIG. 5 is a sectional view taken in the direction of arrows marked 5 of FIG. 2. This view shows how the support rod is connected to top outside circumference of the central hub, by inserting top hooked end of the support rod through aperture of support eye clip, and bottom end of the support rod through aperture of hoop connecting brace. This view also shows the brace that connects the hoops which surround each of the receptacles. FIG. 4 further shows the multi-receptacle support system in its immobilized state using a rigid pin passed through aligned apertures of support post and central hub.

FIGS. 6, 7, 8, 9, and 10, show the many individual pieces which makeup the improved multi-receptacle support system. FIG. 6 shows the top of rack support post. FIG. 7 shows central hub and rack stop pin. FIG. 8 shows a support bracket. FIG. 9 shows a top view of a typical receptacle container basket. FIG. 10 shows details of other rack support pieces.

DETAILED DESCRIPTION OF THE INVENTION

Referring now to FIG. 1, wherein is shown the improved multi-receptacle support system where four circular rings, 23 are held in a quadrilateral arrangement about central support pole, 1. Containers 16 & 17 of different depths and dimensions, are shown inserted into two of the basket-shaped cavities. These basket-shaped cavities are formed by the circular rings at the top and a chain support mesh attached to and hanging down from the circular rings. These basket-shaped cavities provide a more firm and sturdy support structure for the receptacles.

A more detailed view of the circular rings and supporting structure can be seen in FIG. 2. Each of the circular rings 4 is attached to the central pole by "L" shaped support brackets 3. To further provide structural load dispersion and strengthen the circular ring structure, a cross-shaped member comprised of submembers 7, 8, and 9 is added. This cross-shaped member runs in the space in between the circular rings and attaches to the center pole at four places 25. The submember 7 of this cross-member is bent on either end to conform substantially to the slope of the circular ring and is attached thereto. This construction method allows all of the rings to be connected, which helps disperse any lateral forces.

Referring now to FIG. 3 and its enlarged view FIG. 4, a vertically fixed support post 1 is shown, which is comprised of a rigid metal cylinder 14 with a welded cap 6 attached at the upper end. The welded cap 6 contains a centered aperture to which the support post to the central hub connecting bolt 19 is inserted. The cap is held in place by tacking opposite sides of said connecting bolt head 19 to bottom side of the cap 6 before welding to upper end of said rigid metal cylinder 14.

In reference to FIG. 5, the support post 1 is held vertical by a below grade concrete footing 12, which also includes a retaining pin 13 inserted horizontally through aligned apertures placed in the bottom end of the support post 1. Once the concrete cures, the retaining pin becomes fixed in the concrete mass greatly strengthening the rotational resistance of the support post.

Referring back to FIG. 2, the basket support framework comprising the circular rings 4, the chain support mesh 21, and the submembers 7, 8, and 9 are mounted to the top of support post 1 on a horizontal plane to the ground as shown in FIG. 3. As shown in the enlarged view of FIG. 4, a central hub 2, further comprised from a rigid metal cylinder 14, with a welded cap 6 at top end, and having a centered aperture 20 through welded cap 6 is installed. This central hub 2 has an inside diameter greater than the outside diameter of said support post 1, thus providing a means to insert central hub 2 onto top of support post 1. The connecting bolt 19 protrudes through top of central hub 2. Said assembly FIG. 2 further comprises four support brackets 3, which connect to outside circumference of the central hub 2, spaced in equal relation one to the other, radiating outwards from center; in a horizontal relation to the ground.

In reference to FIG. 2, each circular ring 4, a plurality of chain segments 21, are utilized to form the lower support structure for the receptacles placed inside the circular rings. Theses chain segments are connected on one end to a chain ring and on the other end to a common bottom ring as shown in the figures. Four chain segments are utilized to form each receptacle basket assembly. Although chain elements are used here to form the receptacle support baskets, it is understood that other elements can be used to suit the same purpose, such as rope, nylon strap, steel cable, or the like.

The circular rings 4 further comprises a means to adjust the chain elements 21 up and down via connecting bolt 10. This bolt also acts as an adjustment mechanism for said circular ring 4, by adding or subtracting the loops of link chain 21 and inserting said connecting bolt 22 through added or subtracted loop of link chain. Though the above mentioned mechanism is used to adjust said link chain 21, it is understood that various mechanically adjustable means could be used to allow the basket depth to be changed to conform to receptacles of various sizes.

In reference back to FIG. 2, the cross-shaped frame submembers 7 and 8 are attached to the center post by an elongated rod 9. This rod is attached on one end to eye clips 25 weeded at the top end of the central hub 2. A nut 19 is placed on said support post to central hub connecting bolt 19 to connect the entire receptacle frame support assembly to the support post 1 to help control the unnecessary wobbling of an off balance spinning rack in motion 24. An element for rotation 5 is positioned between top of support post 1 and bottom of cap 6 of the said central hub 2. Several different types of elements for rotation can be used to serve the intended purpose of the element for rotation 5, such as Teflon washers 5, roller bearings 5, or the like. A grease plug 18 is provided for greasing said elements for rotation 5, which is located in top of central hub 2 off set from center.

It is intended that improved multi-receptacle containment system presented herein not be limited to any certain fabrication method, because it is known that there are a number of different processes which could be used in the manufacturing process, such as casting, forging, powder metallurgy, welding, riveting, or the like. It is also intended that improved multi-receptacle containment system presented herein, and its many individual pieces, not limited to any particular base material, density, or thickness of base material, because different pieces can and will be manufactured of different base materials such as fiberglass, aluminum, polyethylene, and steel, taking in account the of cost of materials and manufacturing, materials weight, and the safety of manufactured product. It is further intended that the spinning multiple container containment rack not be limited to the size of the invention portrayed herein, which accepts different dimensions and depths of standard waste containers 16 & 17.

What we claim as our invention is:

1. A rotating multi-receptacle support device comprising a vertical support post, a means for anchoring the support post to the ground, a collar placed on top of the end of the support post, a means for rotating the collar about the top end of the support post, and a means extending from the collar for supporting a plurality of receptacles off the ground wherein the supporting means is comprised of a plurality of arms radially extending outward from the collar and a plurality of circular supporting means affixed to one end of each arm for supporting a receptacle off of the ground, wherein the improvement comprises:

a) a receptacle supporting means comprised of a circular retaining ring and a plurality of chain segments of adjustable lengths with one end of the chain segments attached to the retaining ring and the other end of the chain segments attached to a common ring such that the plurality of chains hang below the retaining ring to form a basket-shaped cavity that provides improved bottom and lateral support to a more broad range of receptacle sizes and dimensions that may be placed therein, b) a second structural framework assembly comprising a plurality of rods of same number as the receptacle support means, with each rod attached on one end to the collar and another end attached to the center of a ring bracing member, wherein the ring bracing member further comprises a bar that is attached on either end to the retaining rings such that the second structural framework becomes integral to the receptacle supporting means to provide improved dispersion of lateral forces across the device when heavy receptacles are placed on thereon subjecting the device to an unbalanced loading, and c) a locking means comprised of a removable pin inserted into a series of aligned apertures bored into the collar and support post such that the pin, when inserted through the apertures, prevents rotation of receptacle support means and the second structural framework assembly about the support post.

* * * * *